(12) United States Patent
Markh

(10) Patent No.: US 12,711,488 B2
(45) Date of Patent: Aug. 18, 2026

(54) SYSTEM AND METHOD FOR FACILITATING FRICTIONLESS PAYMENT TRANSACTIONS FIELD

(71) Applicant: Visa International Service Association, San Francisco, CA (US)

(72) Inventor: John Markh, Burlington (CA)

(73) Assignee: Visa International Service Association, San Francisco, CA (US)

( * ) Notice: Subject to any disclaimer, the term of this patent is extended or adjusted under 35 U.S.C. 154(b) by 87 days.

(21) Appl. No.: 18/320,006

(22) Filed: May 18, 2023

(65) Prior Publication Data

US 2024/0386411 A1 Nov. 21, 2024

(51) Int. Cl.
*G06Q 20/40* (2012.01)
*G06Q 20/32* (2012.01)

(52) U.S. Cl.
CPC ..... *G06Q 20/3274* (2013.01); *G06Q 20/3255* (2013.01); *G06Q 20/4012* (2013.01)

(58) Field of Classification Search
None
See application file for complete search history.

(56) References Cited

U.S. PATENT DOCUMENTS

2002/0016765 A1* 2/2002 Sacks .................... G06Q 20/12 705/39
2008/0086759 A1* 4/2008 Colson ............... H04L 63/1416 713/182
2012/0323735 A1* 12/2012 Montero ............. G06Q 20/385 705/26.41
2013/0346302 A1* 12/2013 Purves ................ G06Q 20/102 705/40
2014/0019358 A1* 1/2014 Priebatsch ......... G06Q 20/3274 705/44
2019/0066089 A1* 2/2019 Miryala .............. G06Q 20/367
2021/0110375 A1* 4/2021 Kohli ................. G06Q 20/3276
2021/0192476 A1* 6/2021 Swaminathan ......... G07F 9/002

* cited by examiner

*Primary Examiner* — William J Jacob
(74) *Attorney, Agent, or Firm* — K&L Gates LLP

(57) ABSTRACT

A method, for conducting a secure and frictionless payment transaction involving a merchant device and a cardholder device, includes receiving, by a payment solution provider, transaction details from the merchant device, storing, by the payment solution provider, the transaction details, generating, by the payment solution provider, based on the transaction details, a unique resource locator (URL) for a communication to the cardholder device, wherein the URL is configured to permit the cardholder device to provide payment information for the payment transaction independent of the merchant device, capturing, by the payment solution provider, the payment information communicated by the cardholder device independently of the merchant device, matching, by the payment solution provider, the payment information with the transaction details, and initiating, by the payment solution provider, a transaction authorization request based on the matching of the payment information with the transaction details being successful.

18 Claims, 6 Drawing Sheets

SYSTEM AND METHOD FOR FACILITATING FRICTIONLESS PAYMENT TRANSACTIONS FIELD

TECHNICAL FIELD

At least some aspects of the present disclosure relate to methods, devices, and systems for payment processing that ensures a secure and seamless capture of cardholder data and/or sensitive authentication data.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a method, for conducting a secure and frictionless payment transaction involving a merchant device and a cardholder device, includes receiving, by a payment solution provider, transaction details from the merchant device, storing, by the payment solution provider, the transaction details, generating, by the payment solution provider, based on the transaction details, a unique resource locator (URL) for a communication to the cardholder device, wherein the URL is configured to permit the cardholder device to provide payment information for the payment transaction independent of the merchant device, capturing, by the payment solution provider, the payment information communicated by the cardholder device independently of the merchant device, matching, by the payment solution provider, the payment information with the transaction details, and initiating, by the payment solution provider, a transaction authorization request based on the matching of the payment information with the transaction details being successful.

In various aspects, a method, for conducting a secure and frictionless payment transaction involving a merchant device and a cardholder device, includes receiving, by a computer system, transaction details from the merchant device, generating, by the computer system, based on the transaction details, a first unique resource locator (URL) for a first communication to the cardholder device, wherein the URL is configured to permit the cardholder device to provide payment information including a Payment account number (PAN) associated with a payment card for the payment transaction independent of the merchant device, capturing, by the computer system, the PAN communicated by the cardholder device independently of the merchant device, matching, by the computer system, the payment information with the transaction details, initiating, by the computer system, a transaction authorization request based on the matching of the payment information with the transaction details being successful, determining, by the computer system, that a consumer verification is required, generating, by the computer system, a second unique resource locator (URL) for a second communication to the cardholder device, wherein the second URL is configured to permit the cardholder device to provide a personal identification number (PIN) associated with the payment card independent of the merchant device, and capturing, by the computer system, the PIN communicated by the cardholder device independently of the merchant device.

These, and other objects, features, and characteristics of the present disclosure, as well as the methods of operation, and functions of the related elements of structure, and the combination of parts, and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration, and description only, and are not intended as a definition of the limits of the disclosure.

BRIEF DESCRIPTION OF THE DRAWINGS

Various features of the aspects described herein are set forth with particularity in the appended claims. The various aspects, however, both as to organization, and methods of operation, together with advantages thereof, may be understood in accordance with the following description taken in conjunction with the accompanying drawings as follows:

The apparatuses and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

Figure 1:
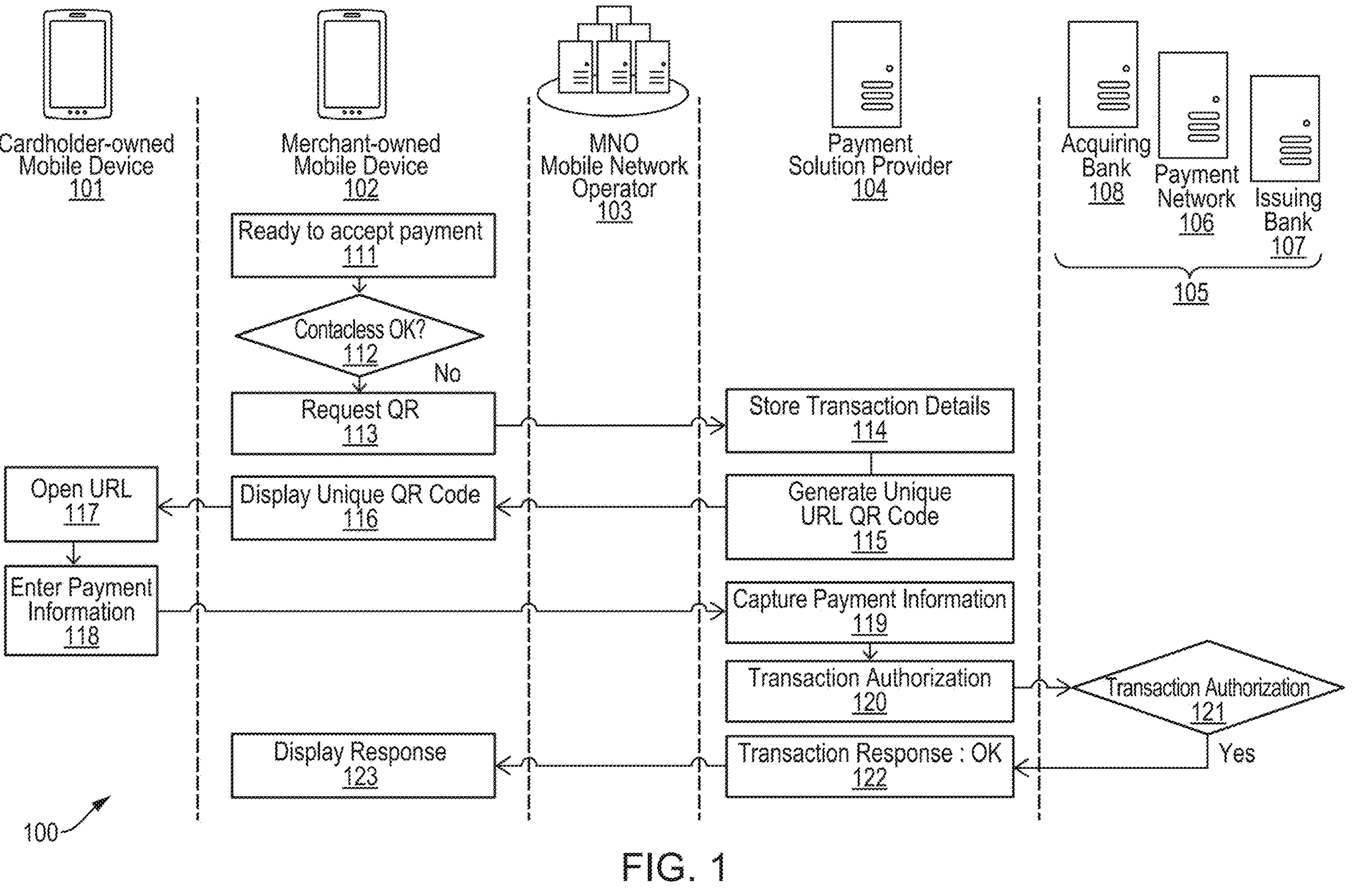
FIG. 1 illustrates a logic flow diagram of a method processing a payment transaction, in accordance with at least one non-limiting aspect of the present disclosure.

Corresponding reference characters indicate corresponding items throughout the several views. The exemplifications set out herein illustrate various aspects of the present disclosure, in one form, and such exemplifications are not to be construed as limiting the scope of the present disclosure in any manner.

DETAILED DESCRIPTION

Before explaining various forms of the payment card, it should be noted that the illustrative forms disclosed herein are not limited in application or use to the details of construction and arrangement of components illustrated in the accompanying drawings and description. The illustrative forms may be implemented or incorporated in other forms, variations and modifications, and may be practiced or carried out in various ways. Further, unless otherwise indicated, the terms and expressions utilized herein have been chosen for the purpose of describing the illustrative forms for the convenience of the reader and are not for the purpose of limitation thereof. Also in the following description, it is to be understood that terms such as "forward," "rearward," "left," "right," "above," "below," "upwardly," "downwardly," and the like are words of convenience and are not to be construed as limiting terms.

A "payment card" can refer to any device that may be used to conduct a transaction, such as a financial transaction. For example, a payment card may be used to provide payment information to a merchant. A payment card can include a substrate such as a paper, metal, or plastic card, and information that is printed, embossed, encoded, and/or otherwise included at or near a surface of the payment card. A payment card can be hand-held and compact so that it can fit into a consumer's wallet and/or pocket (e.g., pocket-sized). A payment card can be a smart card, a debit device (e.g., a debit card), a credit device (e.g., a credit card), a stored value device (e.g., a stored value card or "prepaid" card), a magnetic stripe card, a security card, an access card, a memory card, and/or an identification card, among others. A payment card may operate in a swipe, contact and/or contactless mode. For example, a payment card may be an electronic payment device, such as a smart card, a chip card, an integrated circuit card, and/or a near field communications (NFC) card, among others. An electronic payment device may include an embedded integrated circuit and the embedded integrated circuit may include a data storage medium (e.g., volatile and/or non-volatile memory) to store information associated with the electronic payment device, such as an account identifier and/or a name of an account holder. A payment card may interface with an access device such as a point of sale device to initiate the transaction.

An "access device" may refer to a device that receives information from a payment card to initiate a transaction. For example, an access device may be a point of sale device configured to read account data encoded in a magnetic stripe or chip of a payment card. Other examples of access devices include cellular phones, personal computers, tablets, hand-held specialized readers, set-top boxes, electronic cash registers, automated teller machines (ATMs), virtual cash registers, kiosks, security systems, access systems, and the like. Access devices may use means to interact with a payment card, such as NFC, Bluetooth® low-energy ("BLE"), radio frequency (RF), optical readers, and/or magnetic stripe readers.

As used herein, a "portable electronic device" may refer to any electronic device that is portable and operated by user. Examples of portable electronic devices include smartphones and other mobile phones (e.g., cellular phones), tablet computers, laptop computers, netbooks, personal music players, e-readers, hand-held specialized readers, mobile Wi-Fi devices, handheld gaming systems, navigation systems, storage devices, portable media players, wearable devices (e.g., fitness bands, smart watches, headphones, earbuds), various electronic devices included in automobiles, and any other electronic device that a user may transport, carry, and/or wear. Other portable electronic devices can include robotic devices, remote-controlled devices, personal-care appliances, and so on.

In modern commerce, merchants can utilize a merchant mobile device to initiate a payment transaction. When the payment transaction does not require consumer authentication (e.g., PIN) and the consumer agrees to enter payment information, for example by tapping their payment instrument (e.g., credit card), directly into the merchant mobile device, the payment transaction can proceed in a standard manner.

A consumer can be reluctant, declines, or is unable to enter the payment information on the merchant mobile device, or an additional step is required such as, for example, requiring a separate entry of certain authentication information (e.g. PIN) on the merchant mobile device. Consumers are increasingly reluctant to enter their credit card due to concerns about fraud and security. This is understandable, as there have been a number of high-profile data breaches in recent years that have resulted in millions of credit card numbers being stolen. As a result, consumers are understandably hesitant to give out their personal information to merchants that they do not know or trust.

Various methods, devices, and systems are provided herein to facilitate a payment transaction in instances where the consumer is reluctant, declines, or is unable to enter the payment information on the merchant mobile device. As described below in greater details, various methods, devices, and systems facilitate a transition of the payment information acceptance process to a cardholder mobile device, which is processed as card-not-present/ecommerce transaction.

FIG. 1 illustrates a method 100 for initiating a payment transaction, in accordance with at least one aspect of the present disclosure. FIG. 1 provides a swimlane diagram outlining various interactions among multiple devices and systems associated with execution of portions of the method 100, the devices and systems including, for example, a cardholder mobile device 101, a merchant mobile device 102, an MNO 103, a payment solution provider 104, and a payment infrastructure 105 including a payment network 106, an issuer bank 107, and an acquirer bank 108. In other instances, the payment network 106 can encompass the payment solution provider 104.

In the illustrated example of the method 100, the payment transaction is initiated without directly passing cardholder information to the merchant mobile device 102. The merchant mobile device 102 is ready 111 to accept payment. In some aspects, the merchant mobile device includes a merchant POS application for accepting the payment information. Typically, the consumer can manually enter the payment information into the merchant POS application or, alternatively, can utilize the cardholder mobile device 101 to transmit the payment information, through a contactless option, for example.

As discussed above, the consumer can be reluctant, declines, or is unable to enter the payment information on the merchant mobile device. For example, the consumer may refuse, or may be unable, to utilize the cardholder mobile device 101 to tap the merchant mobile device 102 for a contactless transaction 112. In response, the merchant can trigger the merchant POS application to request 113 a QR code to initiate the payment transaction without payment information from the cardholder and/or the cardholder mobile device being received by the merchant mobile device 102.

In certain instances, the merchant POS application presents an option that can be selected by the merchant to trigger a transmission of the request 113 of the QR code through the MNO 103 to the payment solution provider 104. In various aspects, the request 113 includes transaction details such as, for example, transaction ID, transaction amount, transaction timestamp, and/or merchant information such as geolocation of the merchant. The payment solution provider 104 then generates 115 a unique resource locator (URL) embedded in a QR code that is transmitted through the MNO 103, for example, to the merchant mobile device 102. In various aspects, the QR code is generated 115 based on one or more of the transaction details transmitted with the request 113 from the merchant mobile device 102.

Further to the above, the merchant POS application then displays 116 the received QR code on the merchant mobile device screen, for example. In certain instances, the merchant POS application alerts the merchant to the receipt of the QR code through visual, audio, and/or haptic feedback. For example, the merchant POS application may cause the merchant mobile device 102 to vibrate and/or make a sound indicative of receiving the QR code.

Still referring to FIG. 1, the Cardholder then scans the QR code using the cardholder mobile device 101, for example, which opens 117 the URL to a webpage hosted by the payment solution provider 104. The webpage, originating directly from the payment solution provider 104, implements any suitable security features for performing a secure authentication as well as a secure transition of the payment information to the payment infrastructure 105. In one example, the webpage employs HTTPS with TLS 1.1+ or TLS 1.3 with a valid certificate for domain validation.

Further to the above, the URL presents information that permit the cardholder to assess validity of the requestor. In at least one example, the URL presents merchant identification information such as merchant name, merchant geolocation, and/or certain transaction details such as, for example, transaction amount and/or transaction timestamp. In addition, the URL prompts the cardholder to enter 118 the payment information (e.g. PAN, expiration date, CVV2) to complete the payment transaction initiated by the merchant mobile device 102. Cardholder enters payment information (e.g., PAN, expiry date, CVV2) on the cardholder mobile device 101 into the virtual terminal webpage.

Figure 2:
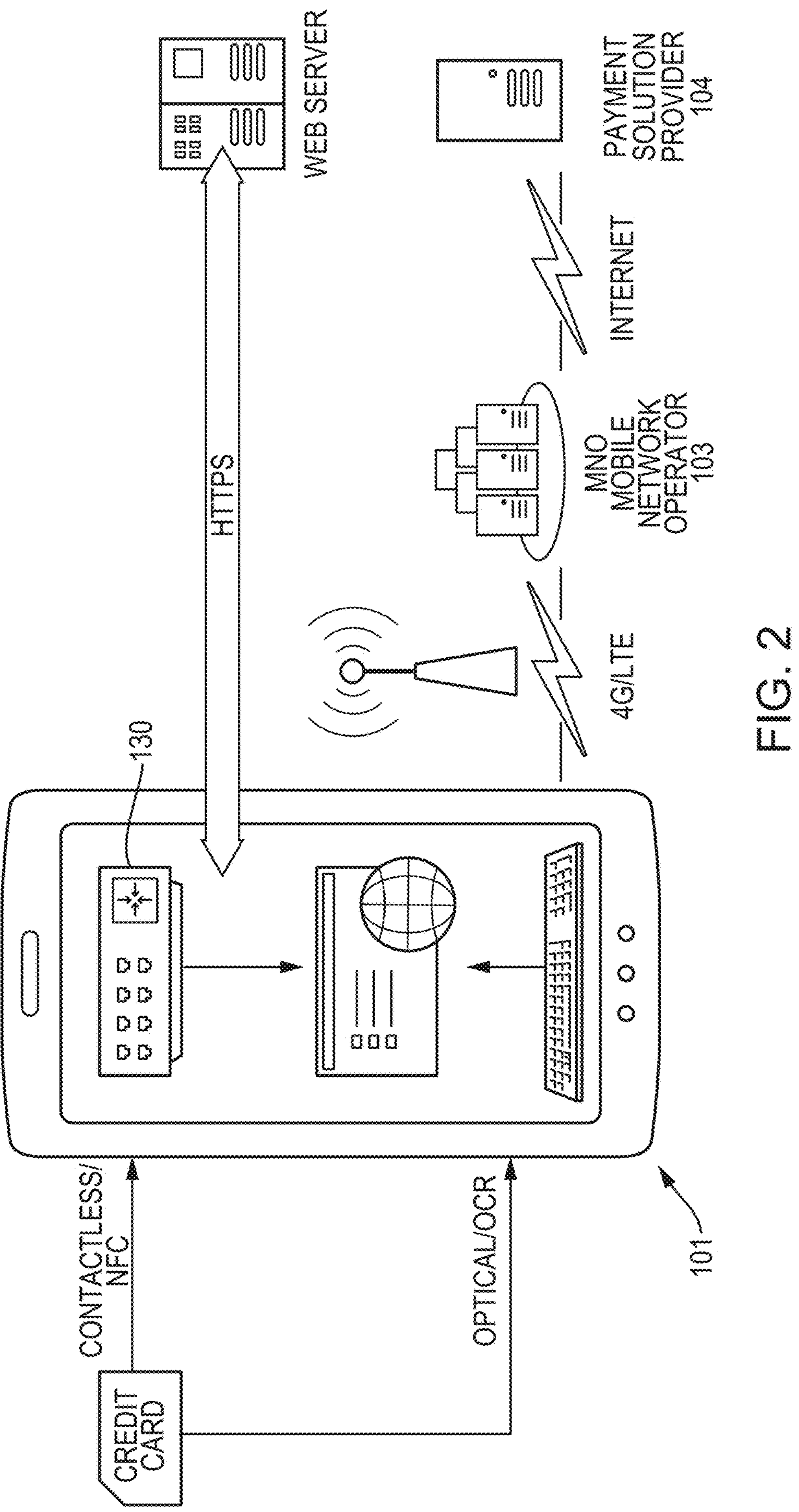
FIG. 2 illustrates a system for processing a payment transaction, in accordance with at least one aspect of the present disclosure.

The method by which the payment information is entered can include, for example, contactless read, optical/OCR, or manual entry, as illustrated in FIG. 2, for example. In certain instances, as illustrated in FIG. 2, the payment information is stored in a wallet application 130 installed on the cardholder mobile device 101, and is extracted for entry into the webpage either manually, or automatically via an API, upon approval by the cardholder. The payment information is then conveyed to the payment solution provider 104 over a secure channel (e.g., HTTPS with TLS 1.3), thus not exposing cardholder data at the merchant mobile device 102 or the MNO 103.

The payment information is then transmitted by the cardholder mobile device 101, for example, through the MNO 103, to the payment solution provider 104 that captures 119 the payment information, and transmits a request 120 for transaction authentication 121 to the payment infrastructure 105.

In various aspects, the payment solution provider 104 matches the payment information with the previously received/stored 114 transaction details, and performs security and fraud detection checks. For example, the payment infrastructure 105 and/or the payment solution provider 104 may confirm that the geolocation of the cardholder mobile device 101 is in close proximity to the merchant mobile device 102, that the timestamp of the transaction request is no more than a predetermined time threshold such as, for example, few minutes, from the QR/URL generation 115, and/or that the QR/URL was not previously used, for example.

In one aspect, the payment solution provider 104 stores previously generated QR codes, and associated transaction details. When a payment information is captured 119, the payment solution provider 104 detects a previously used QR code based on the stored previously-generated QR codes, and associated transaction details.

Further to the above, if 122 the transaction is successfully authenticated by the payment infrastructure 105, a response 122 is transmitted to the payment solution provider 104 validating the transaction. The payment solution provider 104 then transmits a transaction approval response to the merchant mobile device 102 based on receipt of the response 122 indicating the successful authentication. In some aspects, the mobile POS application displays a message indicating the transaction approval.

If, however, the transaction has failed authentication, or has been rejected for other reasons, a response 122 is transmitted by the payment infrastructure 105 to the payment solution provider 104 denying the transaction. In turn, the payment solution provider 104 transmits a response to the merchant mobile device 102, which causes the merchant mobile device 102 to display a message indicative of the denied transaction through the mobile POS application, for example.

Figure 3:
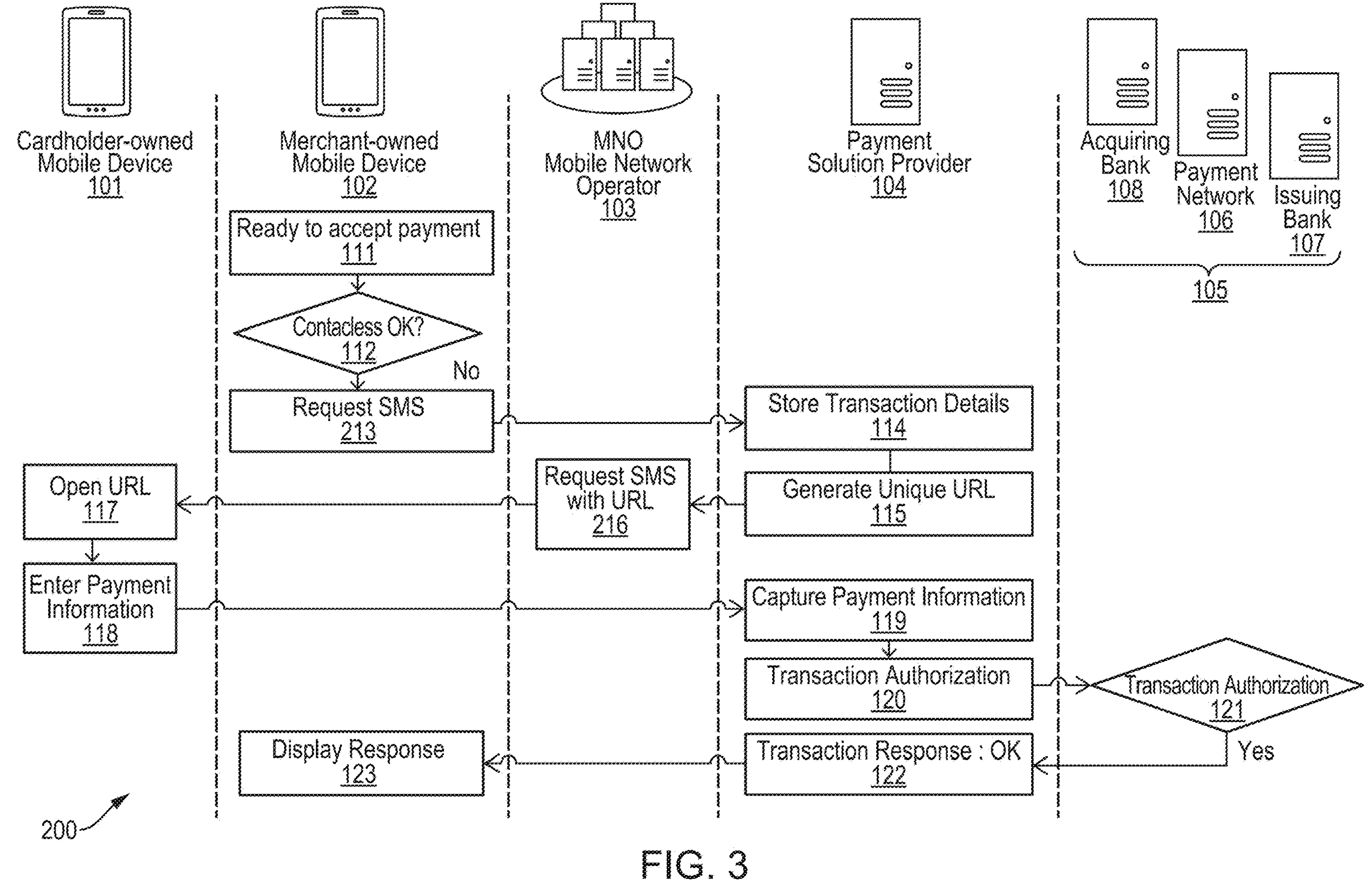
FIG. 3 illustrates a logic flow diagram of a method processing a payment transaction, in accordance with at least one non-limiting aspect of the present disclosure.

While the method 100 employs a QR code to communicate the URL to the cardholder mobile device 101, to effect the transition from merchant mobile device 102 to the cardholder mobile device 101, other embodiments of the present disclosure may employ different forms of communication to achieve the transition. In one example, as illustrated in FIG. 3, a method 200 transmits the URL to the cardholder mobile device using any suitable messaging mechanism such as, for example, a short message service (SMS).

The method 200 is similar in many respects to the method 100, which are not repeated herein for brevity. In the illustrated example, the Payment solution provider 104 works with the MNO to send 216 the URL to the cardholder mobile device 101 using an SMS, for example. The merchant mobile device 102 transmits 213 an SMS request to the payment solution provider 104 through the MNO. In response, the payment solution provider 104 generates 115 the URL based on the transaction details, and sends 216 the URL in an SMS to the cardholder mobile device 101.

Figure 4:
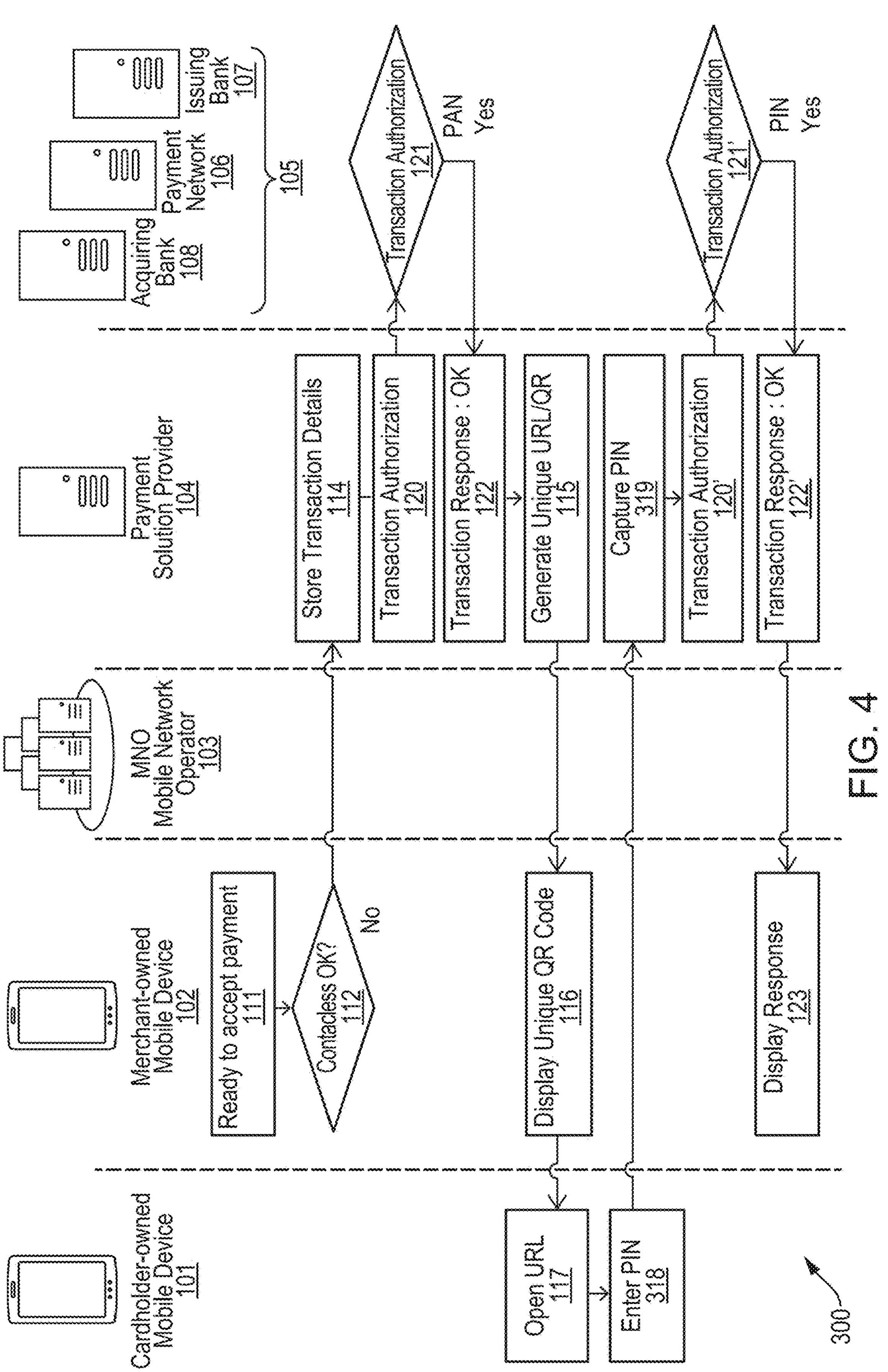
FIG. 4 illustrates a logic flow diagram of a method processing a payment transaction, in accordance with at least one non-limiting aspect of the present disclosure.

Referring now to FIG. 4, a method 300 is similar in many respects to the methods 100, 200, which are not repeated herein for brevity. Unlike the methods 100, 200, the method 300 presents a hybrid approach, wherein certain parts of the payment information are transmitted independently of other parts of the payment information. In one aspect, the PAN is transmitted independently of the PIN, for example in instances where additional consumer verification is required (e.g., high transaction amount or based on the number of previous transactions).

In one aspect, the PAN and the PIN are received separately, by way of QR communications or SMS communications, as previously described in connection with the methods 100, 200. In other aspects, the PAN is delivered directly to the merchant mobile device 102, either manually by the cardholder, or via the cardholder mobile device 101, in a contactless transmission 112, for example, while other parts of the payment information are transmitted to the payment solution provider independently of the merchant mobile device. 102.

In the illustrated example, the PAN and the expiration date are delivered to the merchant mobile device 102, and transmitted to the payment solution provider 104 by the merchant mobile device 102, while the PIN is transmitted to the payment solution provider 104 separately, or independently, from the merchant mobile device 102, for example by the cardholder mobile device 101. If, however, direct entry of the PAN through the merchant mobile device 102 is not possible, or is not desirable, the PAN entry can be transitioned to the cardholder mobile device 101 via the method 100 or the method 200, for example.

In various aspects, to avoid capturing PIN and PAN on the merchant mobile device 102, as part of the payment transaction process, the PIN entry process is securely transitioned to the cardholder mobile device 101. As illustrated in FIG. 4, the transaction is initiated, as previously described in greater detail in connection with the methods 100, 200, through the mobile POS application on the merchant mobile device 102. However, PIN entry is performed on the cardholder mobile device 101, thus not exposing PIN on the merchant mobile device 102.

In other examples, the PIN is transmitted by the merchant mobile device 102 to the payment solution provider 104, while the PAN is transmitted to the payment solution provider 104 by the cardholder mobile device 101.

In the illustrated example, the PAN, but not the PIN, is transmitted by the merchant mobile device 102, through the MNO 103, to the payment solution provider 104 that captures 119 the transaction details, and transmits a request 120 for PAN authentication to the payment infrastructure 105.

Further to the above, if 121 the PAN is successfully authenticated by the payment infrastructure 105, a response 122 is transmitted to the payment solution provider 104 validating the PAN. The payment solution provider 104 then transmits a communication to the cardholder mobile device 101 in the form of a QR code, or in the form of an SMS, requesting the PIN associated with the validated PAN.

In certain aspects, the payment solution provider 104 detects an identifier associated with the cardholder mobile device 101 based on the validated PAN, and initiates the communication to cardholder mobile device 101 requesting the PIN associated with the validated PAN.

In the illustrated example, the merchant mobile device 102 displays 116 a QR code transmitted by the payment solution provider 104, which is scanned by the cardholder mobile device 101 to open the URL to a webpage hosted by the payment solution provider 104. The webpage includes enough information for the cardholder to assess whether it is a valid request. In one example, the webpage includes the merchant identification information such as, for example, a merchant name. Additionally, the webpage may further provide the geolocation of the merchant, timestamp, the transaction amount, etc.

The cardholder then enters 318 the PIN through the webpage. The payment solution provider 104 captures 319 the PIN, and initiates a second authentication, transmitting a request 120' for PIN authentication 121' to the payment infrastructure 105.

If 121' the PIN is successfully authenticated by the payment infrastructure 105, a response 122' is transmitted to the payment solution provider 104 validating the PIN. In response, the payment solution provider 104 then transmits a communication to the merchant mobile device informing of the transaction approval.

In various aspects, the payment solution provider 104 matches the payment information with the previously received transaction information, and performs further security and fraud detection checks. In certain instances, as described in greater detail below, the payment infrastructure 105 confirms that the geolocation of the cardholder mobile device 101 is in close proximity to the merchant mobile device 102, that the timestamp of the transaction request is no more than a few minutes of the QR/URL generation 115, and/or that the QR/URL was not previously used. Furthermore, upon successful confirmation of the transaction and payment information, the payment infrastructure forms a PIN block (e.g., ISO PIN Block Format 4), and the payment solution provider 104 proceeds with a normal transaction authorization flow.

Figure 5:
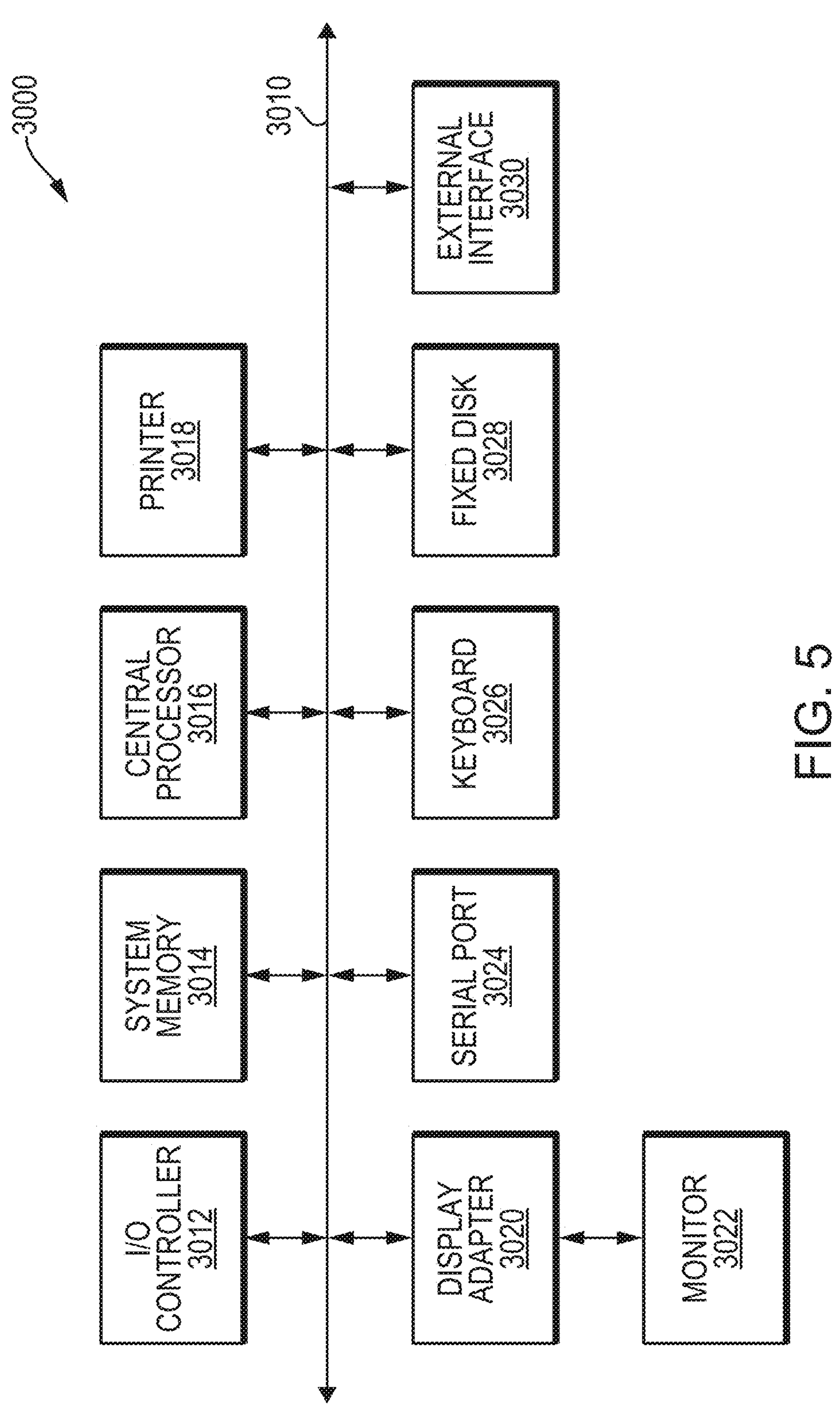
FIG. 5 is a block diagram of a computer apparatus with data processing subsystems or components, according to at least one aspect of the present disclosure.
Figure 6:
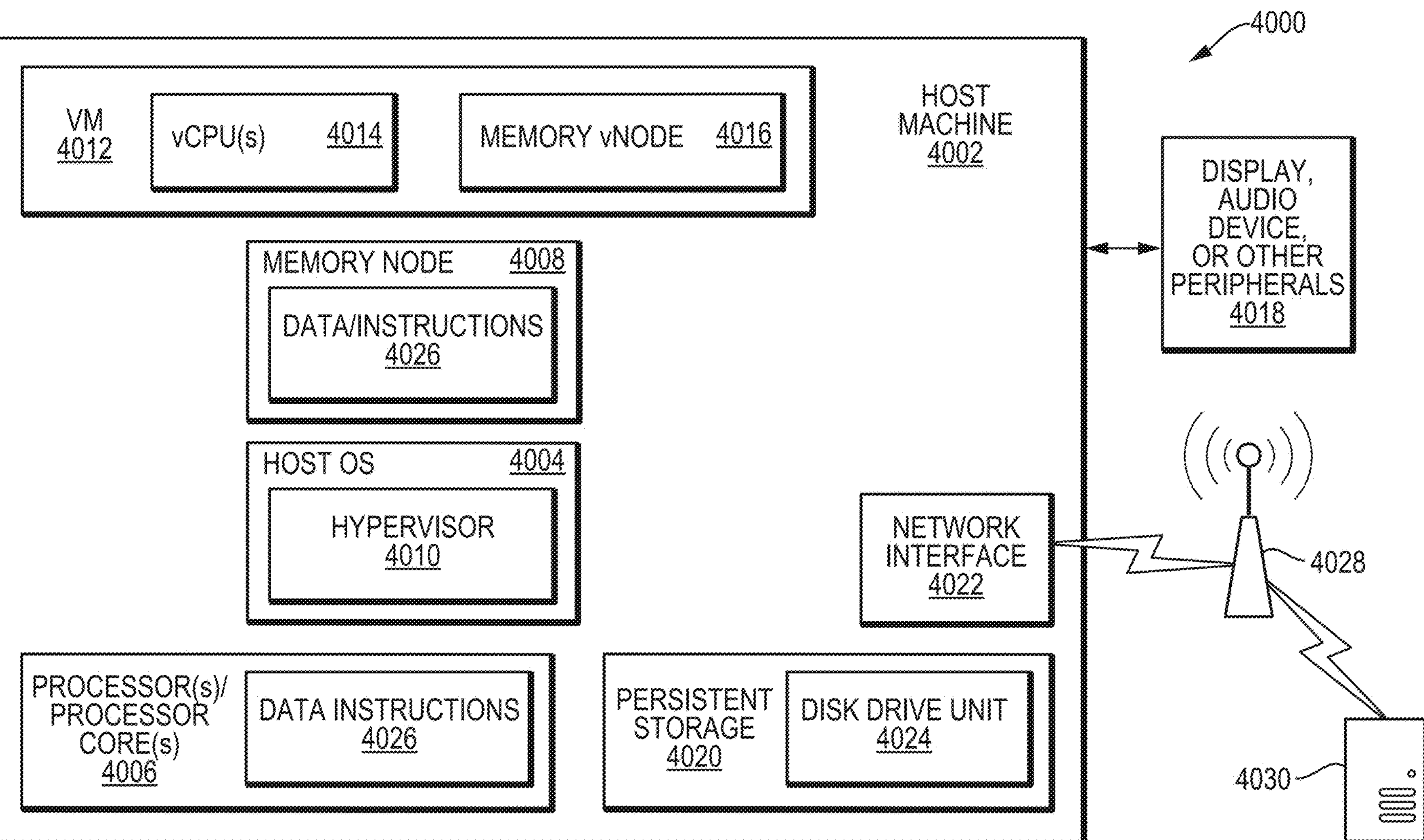
FIG. 6 is a diagrammatic representation of an example 4000 that includes a host machine within which a set of instructions to perform any one or more of the methodologies discussed herein may be executed, according to at least one aspect of the present disclosure.

The foregoing methods and algorithms can be implemented on a computer apparatus and system described in FIGS. 5 and 6. FIG. 5 is a block diagram of a computer apparatus 3000 with data processing subsystems or components, according to at least one aspect of the present disclosure. The subsystems shown in FIG. 5 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

FIG. 6 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 3002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term “computer-readable medium” or “machine-readable medium” should be taken to include a single medium or multiple medium (e.g., a centralized or distributed database and/or associated caches and servers) that store the one or more sets of instructions. The term “computer-readable medium” shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term “computer-readable medium” shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of methods according to various aspects of the present disclosure are provided below in the following numbered clauses. An aspect of any of the method(s) may include any one or more than one, and any combination of, the numbered clauses described below.

Clause 1. A method, for conducting a secure and frictionless payment transaction involving a merchant device and a cardholder device, includes receiving, by a payment solution provider, transaction details from the merchant device, storing, by the payment solution provider, the transaction details, generating, by the payment solution provider, based on the transaction details, a unique resource locator (URL) for a communication to the cardholder device, wherein the URL is configured to permit the cardholder device to provide payment information for the payment transaction independent of the merchant device, capturing, by the payment solution provider, the payment information communicated by the cardholder device independently of the merchant device, matching, by the payment solution provider, the payment information with the transaction details, and initiating, by the payment solution provider, a transaction authorization request based on the matching of the payment information with the transaction details being successful.

Clause 1. The method of Clause 2, wherein the communication to the cardholder device comprises: generating, by the payment solution provider, a QR code that embeds the URL; and sending, by the payment solution provider, through a communication network, the QR code to the merchant device for displaying to the cardholder device Clause 3. The method of Clause 1 or Clause 2, wherein the communication to the cardholder device comprises a message that includes the URL.

Clause 4. The method of Clause 3, wherein the message is transmitted to the cardholder device by a short message service (SMS).

Clause 5. The method of Clause 1 or Clause 2, wherein the matching of the payment information with the transaction details comprises checking a physical proximity of the cardholder device and the merchant device.

Clause 6. The method of Clause 1 or Clause 2, wherein the matching of the payment information with the transaction details comprises checking a temporal proximity of a timestamp associated with the transaction details and a corresponding timestamp associated with the generation of the URL.

Clause 7. The method of Clause 1 or Clause 2, wherein the matching of the payment information with the transaction details comprises checking that the URL has not been previously received by the payment solution provider.

Clause 8. The method of Clause 1 or Clause 2, comprising receiving, by the payment solution provider, a primary account number (PAN) associated with a payment card for conducting the payment transaction, wherein the payment card comprises a personal identification number (PIN) associated with the PAN, wherein the PIN is received by the payment solution provider independently of the PAN.

Clause 9. The method of Clause 8, further comprising: determining, by the payment solution provider, that a consumer verification is required; and requesting the PIN based on determining that the consumer verification is required.

Clause 10. The method of Clause 9, wherein determining, by the payment solution provider, that the consumer verification is required is based on a transaction amount reaching or exceeding a predetermined threshold.

Clause 11. The method of Clause 9, wherein determining, by the payment solution provider, that the consumer verification is required is based on a number of previous transactions by the payment card reaching or exceeding a predetermined threshold.

Clause 12. A method, for conducting a secure and frictionless payment transaction involving a merchant device and a cardholder device, includes receiving, by a computer system, transaction details from the merchant device, generating, by the computer system, based on the transaction details, a first unique resource locator (URL) for a first communication to the cardholder device, wherein the URL is configured to permit the cardholder device to provide payment information including a Payment account number (PAN) associated with a payment card for the payment transaction independent of the merchant device, capturing, by the computer system, the PAN communicated by the cardholder device independently of the merchant device, matching, by the computer system, the payment information with the transaction details, initiating, by the computer system, a transaction authorization request based on the matching of the payment information with the transaction details being successful, determining, by the computer system, that a consumer verification is required, generating, by the computer system, a second unique resource locator (URL) for a second communication to the cardholder device, wherein the second URL is configured to permit the cardholder device to provide a personal identification number (PIN) associated with the payment card independent of the merchant device, and capturing, by the computer system, the PIN communicated by the cardholder device independently of the merchant device.

Clause 13. The method of Clause 12, wherein the first communication to the cardholder device comprises: generating, by the computer system, a QR code that embeds the URL; and sending, by the computer system, through a communication network, the QR code to the merchant device for displaying to the cardholder device.

Clause 14. The method of Clause 12, wherein the first communication to the cardholder device comprises a message that includes the URL.

Clause 15. The method of Clause 14, wherein the message is transmitted to the cardholder device by a short message service (SMS).

Clause 16. The method of any one of Clauses 12-15, wherein the matching of the payment information with the transaction details comprises checking a physical proximity of the cardholder device and the merchant device.

Clause 17. The method of any one of Clauses 12-15, wherein the matching of the payment information with the transaction details comprises checking a temporal proximity of a timestamp associated with the transaction details and a corresponding timestamp associated with the generation of the URL.

Clause 18. The method of any one of Clauses 12-15, wherein the matching of the payment information with the transaction details comprises checking that the URL has not been previously received by the computer system.

Clause 19. The method of any one of Clauses 12-15, wherein determining that the consumer verification is required is based on a transaction amount reaching or exceeding a predetermined threshold.

Clause 20. The method of any one of Clauses 12-15, wherein determining that the consumer verification is required is based on a number of previous transactions by the payment card reaching or exceeding a predetermined threshold.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term “logic” may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms “component,” “system,” “module” and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to,"

"related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method for conducting a secure and frictionless payment transaction involving a merchant device and a cardholder device, the method comprising:

receiving, by a payment solution provider, transaction details from the merchant device via a mobile network, wherein the transaction details are specific to the payment transaction and comprise a transaction amount and a merchant geolocation;

storing, by the payment solution provider, the transaction details;

generating, by the payment solution provider, based on the transaction details specific to the payment transaction received from the merchant device, a unique resource locator (URL) specific to the payment transaction for a communication to the cardholder device, wherein the URL is configured to permit the cardholder device to provide payment information for the payment transaction to the payment solution provider via the mobile network independent of the merchant device;

capturing, by the payment solution provider, the payment information communicated by the cardholder device via the mobile network independently of the merchant device;

matching, by the payment solution provider, the payment information communicated by the cardholder device via the mobile network with the transaction details, wherein the matching of the payment information with the transaction details comprises checking a physical proximity of the cardholder device and the merchant device based on the merchant geolocation and a cardholder device geolocation and verifying that the URL has not been previously used to conduct a different payment transaction; and initiating, by the payment solution provider, a transaction authorization request based on the matching of the payment information with the transaction details being successful.

2. The method of claim 1, wherein the communication to the cardholder device comprises:

generating, by the payment solution provider, a QR code that embeds the URL; and sending, by the payment solution provider, through the mobile network, the QR code to the merchant device for displaying to the cardholder device.

3. The method of claim 1, wherein the communication to the cardholder device comprises a message that includes the URL.

4. The method of claim 3, wherein the message is transmitted to the cardholder device by a short message service (SMS).

5. The method of claim 1, wherein the matching of the payment information with the transaction details comprises checking a temporal proximity of a timestamp associated with the transaction details and a corresponding timestamp associated with the generation of the URL.

6. The method of claim 1, wherein the matching of the payment information with the transaction details comprises checking that the URL has not been previously received by the payment solution provider.

7. The method of claim 1, comprising receiving, by the payment solution provider, a primary account number (PAN) associated with a payment card for conducting the payment transaction, wherein the payment card comprises a personal identification number (PIN) associated with the PAN, wherein the PIN is received by the payment solution provider independently of the PAN.

8. The method of claim 7, further comprising:

determining, by the payment solution provider, that a consumer verification is required; and requesting the PIN based on determining that the consumer verification is required.

9. The method of claim 8, wherein determining, by the payment solution provider, that the consumer verification is required is based on the transaction amount reaching or exceeding a predetermined threshold.

10. The method of claim 8, wherein determining, by the payment solution provider, that the consumer verification is required is based on a number of previous transactions by the payment card reaching or exceeding a predetermined threshold.

11. A method for conducting a secure and frictionless payment transaction involving a merchant device and a cardholder device, the method comprising:

receiving, by a computer system, transaction details from the merchant device via a mobile network, wherein the transaction details are specific to the payment transaction and comprise a transaction amount and a merchant geolocation;

generating, by the computer system, based on the transaction details, a first unique resource locator (URL)

specific to the payment transaction for a first communication to the cardholder device, wherein the URL is configured to permit the cardholder device to provide payment information via the mobile network to the computer system independent of the merchant device, the payment information including a payment account number (PAN) associated with a payment card for the payment transaction;

capturing, by the computer system, the PAN communicated by the cardholder device independently of the merchant device;

matching, by the computer system, the payment information provided by the cardholder device via the mobile network with the transaction details, wherein the matching of the payment information with the transaction details comprises checking a physical proximity of the cardholder device and the merchant device based on the merchant geolocation and a cardholder device geolocation and verifying that the URL has not been previously used to conduct a different payment transaction;

initiating, by the computer system, a transaction authorization request based on the matching of the payment information with the transaction details being successful;

determining, by the computer system, that a consumer verification is required;

generating, by the computer system based on determining that a consumer verification is required, a second unique resource locator (URL) for a second communication to the cardholder device, wherein the second URL is configured to permit the cardholder device to provide a personal identification number (PIN) associated with the payment card via the mobile network to the computer system independent of the merchant device; and capturing, by the computer system, the PIN communicated by the cardholder device independently of the merchant device.

12. The method of claim 11, wherein the first communication to the cardholder device comprises:

generating, by the computer system, a QR code that embeds the URL; and sending, by the computer system, through the mobile network, the QR code to the merchant device for displaying to the cardholder device.

13. The method of claim 11, wherein the first communication to the cardholder device comprises a message that includes the URL.

14. The method of claim 13, wherein the message is transmitted to the cardholder device by a short message service (SMS).

15. The method of claim 11, wherein the matching of the payment information with the transaction details comprises checking a temporal proximity of a timestamp associated with the transaction details and a corresponding timestamp associated with the generation of the URL.

16. The method of claim 11, wherein the matching of the payment information with the transaction details comprises checking that the URL has not been previously received by the computer system.

17. The method of claim 11, wherein determining that the consumer verification is required is based on the transaction amount reaching or exceeding a predetermined threshold.

18. The method of claim 11, wherein determining that the consumer verification is required is based on a number of previous transactions by the payment card reaching or exceeding a predetermined threshold.

* * * * *